J. H. & A. E. GILMAN.
SCREEN.
APPLICATION FILED MAY 11, 1916.
1,212,344.
Patented Jan. 16, 1917.
4 SHEETS—SHEET 1.
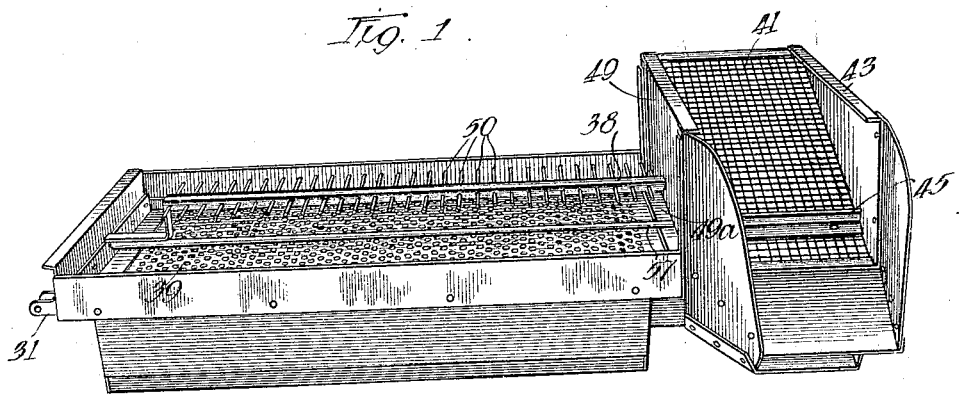
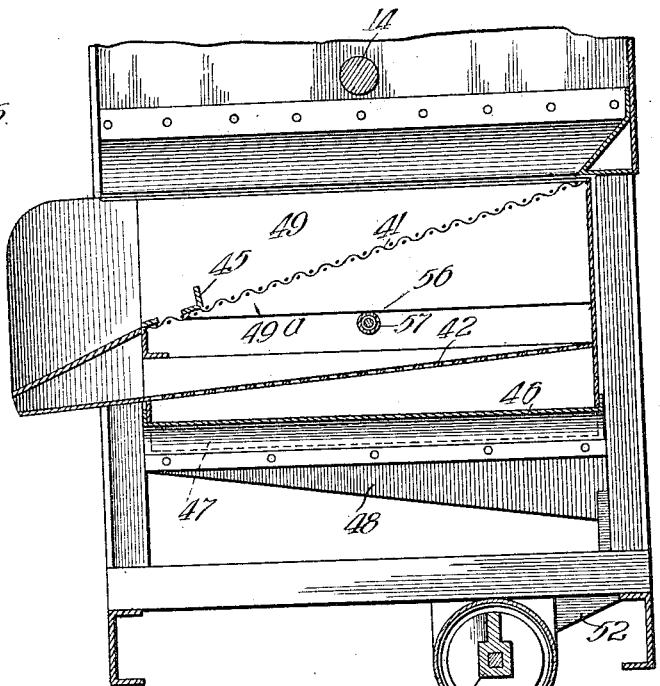

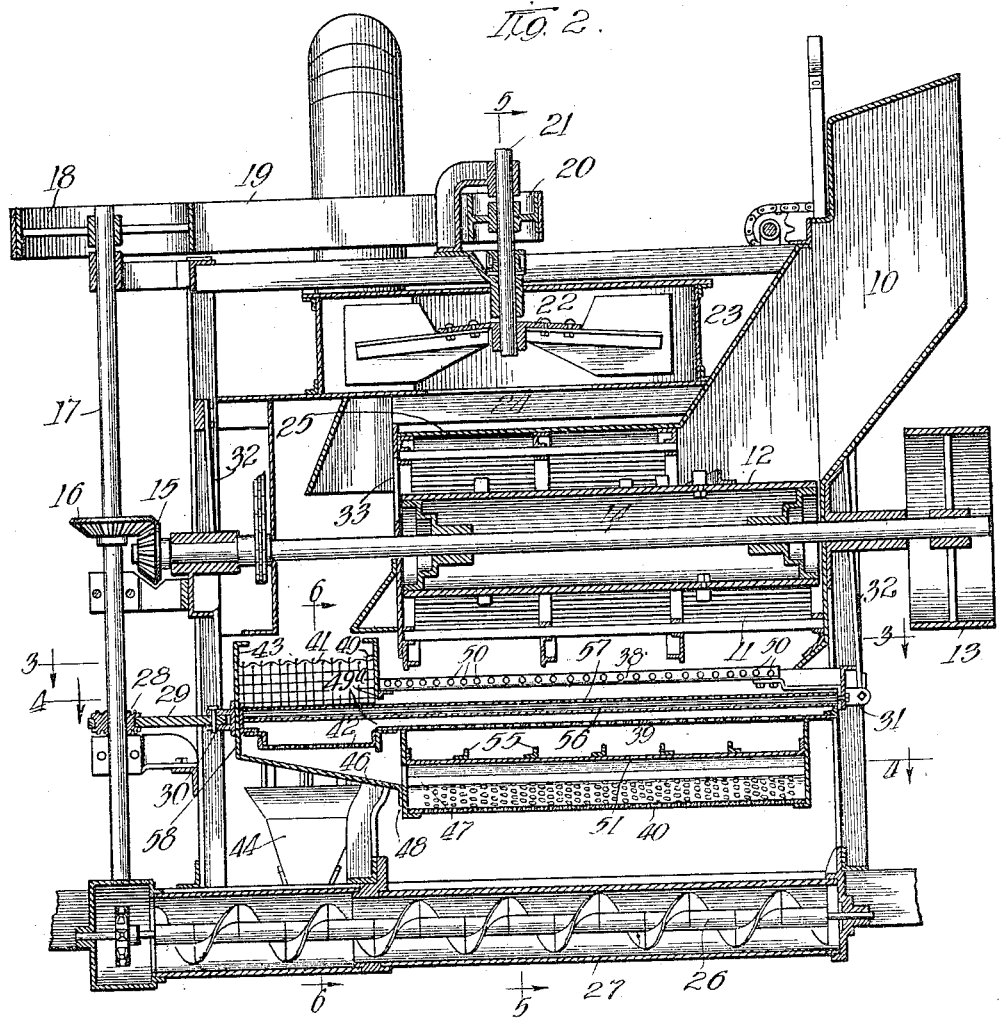

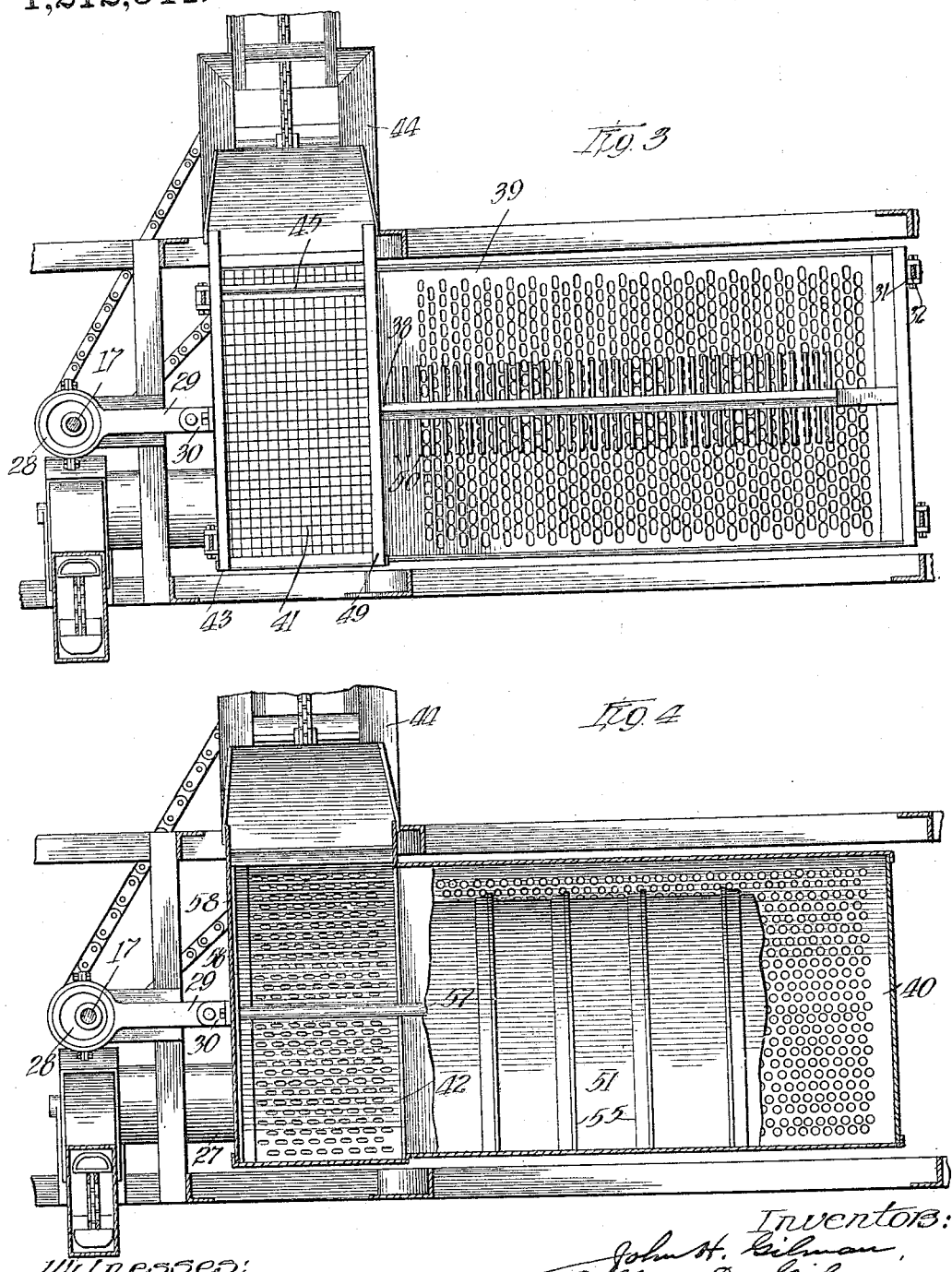

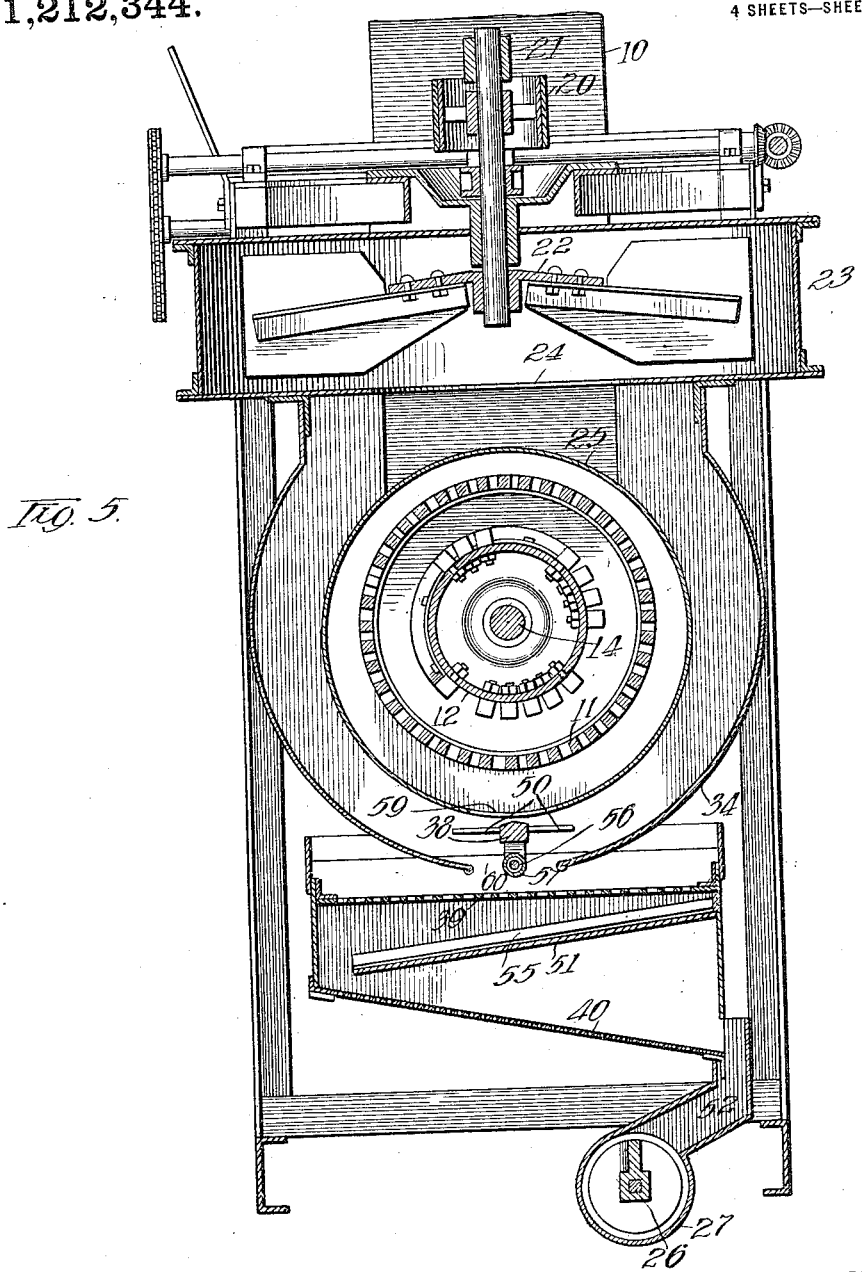

UNITED STATES PATENT OFFICE.

JOHN H. GILMAN AND ALBERT E. GILMAN, OF OTTAWA, ILLINOIS, ASSIGNORS TO KING & HAMILTON COMPANY, OF OTTAWA, ILLINOIS, A CORPORATION OF ILLINOIS.

SCREEN.

1,212,344. Specification of Letters Patent. Patented Jan. 16, 1917.

Original application filed March 11, 1916, Serial No. 83,477. Divided and this application filed May 11, 1916. Serial No. 96,812.

*To all whom it may concern:*

Be it known that we, JOHN H. GILMAN and ALBERT E. GILMAN, citizens of the United States, and residents of Ottawa, in the county of La Salle and State of Illinois, have invented certain new and useful Improvements in Screens, of which the following is a full, clear, and exact specification.

Our invention is concerned with certain improvements in screens designed primarily for use in corn shellers, and which screens are adapted to receive the shelled corn, cobs, detached husks and silks, and deliver the cobs and shelled corn, free from any husks and silks, to their respective delivery spouts or feeders.

To illustrate our invention, we have annexed hereto four sheets of drawings, in which the same reference characters are used to designate identical parts in all the figures, of which,—

Figure 1 is a perspective view of the screen detached from its associated mechanism; Fig. 2 is a central longitudinal section through a corn sheller in which the screen is employed; Fig. 3 is a top plan view in section on the line 3—3 of Fig. 2; Fig. 4 is a plan view in section on the line 4—4 of Fig. 2; Fig. 5 is a vertical section on the line 5—5 of Fig. 2; and Fig. 6, Sheet 1, is a sectional view on the line 6—6 of Fig. 2. Fig. 2 is on a certain scale; Figs. 1, 3 and 4 are on a somewhat larger scale; while Figs. 5 and 6 are on a still larger scale.

Referring first to Figs. 2 and 5, we have shown our improvements in screens as embodied in the corn sheller shown in our application No. 83,477, filed March 11, 1916, of which the present application is a division required by the Commissioner of Patents. In this machine, the ear corn is fed into the receiving hopper 10, whence it passes down into the concave 11, where it is acted on by the rotating cylinder 12, which is driven by power applied to the belt-wheel 13 secured on the cylinder-shaft 14, journaled in suitable bearings in the framework. The cylinder-shaft has on its other end the bevel gear wheel 15 meshing with the bevel gear wheel 16 secured on the vertical shaft 17 journaled in suitable bearings at the end of the machine, and having the belt wheel 18 on the upper end thereof connected by the belt 19 with the belt-pulley 20 secured on the short vertical shaft 21 mounted on suitable bearings and having secured on its lower end the fan 22 mounted to rotate in the fan-casing 23, which has the entrance aperture 24 in the bottom thereof, and over the sheet-metal cylinder 25 which surrounds the adjacent portion of the concave, as best seen in Fig. 5. At the lower end of the machine is the longitudinally extending screw-conveyer 26 rotating in the conveyer-trough 27, into which the corn is discharged from the screen mechanism, which is seen detached and in perspective in Fig. 1. An eccentric 28, suitably secured on the shaft 27, is connected by the eccentric rod 29 with the ears 30 projecting from one end of the screen, which also has at the four corners thereof other ears 31 by which it is suspended by the bars 32 from suitable points of support in the upper portion of the framework so that the rotation of the shaft 17 serves to shake the screen in the customary manner.

Referring now to all the figures, the screen or separating shoe constituting the subject-matter of the present invention contains many novel features of construction, and will be seen to have three screens 38, 39 and 40 directly beneath the shelling concave, for screening the shelled corn, while at the discharge end of the machine it has two transverse screens 41 and 42 for screening the corn from the cobs which are discharged on the screen 41 from the discharge end of the concave through the aperture 33 found in the upper end thereof. These screens 41 and 42 are supported in what is in effect a transverse trough 43 secured at the discharge end of the shoe, and the screen 41 on which the cobs are discharged is inclined somewhat sharply to allow the cobs to descend therefrom by gravity into the hopper 44 of the cob conveyer. To prevent shelled corn from possibly escaping off of this screen with the cobs, we place the bar 45, preferably constructed of a piece of angle iron, across the screen 41 toward the discharge end. Below the screen 41 is the finer screen 42, and the shelled corn passing through these screens falls onto the inclined bottom 46 of the cob extension, and thence passes through the longitudinal aperture 47 in the end 48 of the main body of the shoe onto the bottom screen 40 of the shoe proper.

The screen 38, interposed between the inner side 49 of the chute 43 and the other end of the shoe, is preferably constructed of a long wooden bar having teeth 50 extending therethrough, as seen in Figs. 1 and 3. This forms a coarse comb-like screen on which the light ends of the cobs, if any are broken off, are arrested, so that the current of air rushing up in the passages between the inner cylinder 25 and the outer cylinder 34 will draw said light ends of the cobs upward and discharge them into the suction fan, whence they are delivered with the husks. The screen 39 is of the ordinary construction to permit the passage of shelled corn, and is substantially level except for a slight inclination along the length of the machine, which inclination is given to aid in the feeding of the corn through the machine, and which also serves to distribute the grain more uniformly along the length of the screen, as it will be understood that there is more grain discharged from the receiving end of the concave than from the discharge end. If any shelled grain passes over the end of the screen 39, it falls through an elongated opening 49ª formed in the inner wall 49 of the chute 43, and falls onto the screen 42, which is slightly lower, and is carried back by the inclined plate or bottom 46 onto the screen 40. As best seen in Figs. 2, 4 and 5, the screens 39 and 40 have interposed between them an inclined plate 51, which serves the purpose of compelling the shelled grain passing through the screen 39 to be delivered to the higher end of the screen 40, so that the grain must roll down the entire incline of the screen 40 before it can discharge into the passage 52 leading to the cylinder 27, in which the screw-conveyer 26 is mounted. The passage of the grain over this screen 40 insures all the half grains or small grains being screened out; but if it is desired to preserve this broken or small grain, the screen 40, which is removable, can be taken out and replaced by an imperforate plate. To distribute the grain from the screen 39 more uniformly along the entire length of the screen 40, we employ the ribs 55 extending transversely of the plate 51, as best seen in Fig. 4. The two ends of the shoe are connected by the rod 56 passing through the tube 57, the parts being thus braced and stiffened, and the outer side 58 of the cob-trough has the previously mentioned ears 30 connected to the eccentric strap 29 for shaking the screen, as previously explained.

As will be best seen in Fig. 5, the screen 38 extends between the lower portions of the cylinders 25 and 34, and between the elongated apertures 59 and 60, which are formed in the bottoms of the cylinders 25 and 34, respectively, to permit the escape of the shelled corn therefrom.

While we have shown and described our invention as embodied in the form which we at present consider best adapted to carry out its purposes, it will be understood that it is capable of modifications, and that we do not desire to be limited in the interpretation of the following claims except as may be necessitated by the state of the prior art.

What we claim as new, and desire to secure by Letters Patent of the United States is:

1. In a sheller, a frame supporting a shelled-corn riddle at the middle and one end thereof having a pair of screens, and at the other end on a higher level a cob riddle having two screens, the lower intermediate of the corn screens, the overflow from the upper corn screen discharging at its adjacent end upon the lower cob screen, and a plate below the lower cob screen to discharge on the lower corn screen.

2. In a sheller, a screen-frame supporting at the middle and one end thereof a pair of corn-screens, the lower one of finer mesh and inclined to discharge the shelled corn from one side thereof, and its overflow at one end upon the cob screen, a cob-screen supported at the other end of the frame and inclined to discharge in the opposite direction, and a plate beneath the cob screen discharging upon the lower corn screen.

3. In a sheller, a screen-frame supporting at the middle and one side thereof a shelled-corn screen, an imperforate inclined plate beneath the screen, and beneath the inclined plate another screen inclined in the opposite direction, and supporting at the other end thereof a cob-screen inclined to discharge in the opposite direction from the lowermost grain-screen.

4. In a sheller, a screen-frame supporting at the middle and one end thereof a shelled-corn screen, an inclined imperforate plate beneath the shelled-corn screen, and a finer corn-screen beneath the imperforate plate inclined in the opposite direction, and at the other end a pair of cob-screens, one below the level of the upper corn-screen and upon one end of which said upper corn-screen may discharge, and the other cob-screen above the level of the upper corn-screen.

5. In a sheller, a screen-frame inclined slightly along its length, a cob-screen secured at one end and extending transversely thereof, a finer cob-screen secured directly beneath the first cob-screen, a substantially horizontal grain-screen on a level between the two cob-screens and discharging material coarser than its perforations on the lower cob-screen.

6. In a sheller, a screen-frame inclined slightly along its length, a cob-screen secured at one end and extending transversely thereof, a finer cob-screen secured directly beneath the coarse cob-screen, a substantially horizontal grain-screen on a level between the two cob-screens and discharging material coarser than its perforations on the lower cob-screen, a lower corn-screen below the upper one, and an inclined plate below the lower cob-screen discharging on the lower corn-screen.

7. In a sheller, a screen-frame inclined slightly along its length, a cob-screen secured at one end and extending transversely thereof, a finer cob-screen secured directly beneath the coarse cob-screen, a substantially horizontal grain-screen on a level between the two cob-screens and discharging material coarser than its perforations on the lower cob-screen, a lower corn-screen below the upper one, an inclined plate below the lower cob-screen discharging on the lower corn-screen, and an inclined deflecting plate between the corn-screens inclined in the opposite direction to the lowermost one to carry the corn to the cob side of said lower corn-screen.

In witness whereof, we have hereunto set our hands and affixed our seals, this 6th day of May A. D. 1916.

JOHN H. GILMAN. [L. S.]
ALBERT E. GILMAN. [L. S.]

Witnesses:
AUGUST LEDRICH,
FRED E. IRION.

Copies of this patent may be obtained for five cents each, by addressing the "Commissioner of Patents, Washington, D. C."